United States Patent [19]

Bagdis

[11] 4,293,208

[45] Oct. 6, 1981

[54] PREBIAS FOR DIGITAL LIGHT INTEGRATOR

[75] Inventor: Judy Bagdis, Bradford, Mass.

[73] Assignee: Polaroid Corporation, Cambridge, Mass.

[21] Appl. No.: 198,781

[22] Filed: Oct. 20, 1980

[51] Int. Cl.³ .................. G03B 7/083; G03B 7/087
[52] U.S. Cl. .................................. 354/29; 354/51; 354/60 R
[58] Field of Search .............. 354/27, 29, 30, 51, 354/60 R

[56] References Cited

U.S. PATENT DOCUMENTS

| | | | |
|---|---|---|---|
| 3,350,603 | 10/1967 | Erickson | 315/151 |
| 3,350,604 | 10/1967 | Erickson | 315/151 |
| 3,450,939 | 6/1969 | Misencik | 315/156 |
| 3,478,660 | 11/1969 | Land | 354/139 |
| 3,620,143 | 11/1971 | Burgarella | 354/149 |
| 3,690,229 | 9/1972 | Kikuchi et al. | 354/34 |
| 3,698,298 | 10/1972 | Kikuchi et al. | 354/33 |
| 3,727,526 | 4/1973 | Hinds | 354/51 |
| 3,818,204 | 6/1974 | Hadida | 235/183 |
| 3,860,936 | 1/1975 | Harvey | 354/51 |
| 3,885,880 | 5/1975 | Tsunekawa et al. | 356/226 |
| 3,942,183 | 3/1976 | Whiteside | 354/29 |
| 3,969,735 | 7/1976 | Nobusawa | 354/29 |
| 3,977,014 | 8/1976 | Norris | 354/196 |
| 4,009,866 | 3/1977 | Iwata et al. | 354/29 |
| 4,040,072 | 8/1977 | Johnson et al. | 354/173 |
| 4,053,907 | 10/1977 | Iwata et al. | 354/29 |
| 4,156,564 | 5/1979 | Tsunekawa et al. | 354/59 |
| 4,188,103 | 2/1980 | Biber et al. | 354/27 |
| 4,192,587 | 5/1980 | La Rocque et al. | 354/27 |

Primary Examiner—Michael L. Gellner
Attorney, Agent, or Firm—Edward S. Roman

[57] ABSTRACT

In an exposure control system in which the instant in which the scene light is first admitted to a film plane from a shutter blade mechanism at the commencement of an exposure interval must be precisely and accurately determined for subsequently controlling the instant of flash fire and/or other exposure control functions utilizing digital scene light integrating techniques, there is provided an arrangement for prebiasing the light integrator to provide an output therefrom within an operative range of voltages immediately prior to detection of first light at commencement of the exposure interval in order to eliminate any potential errors which might otherwise result in the detection of first light at the commencement of the exposure interval or any other scene light related measurement resulting from the integration lead time required for the digital type of light integrating arrangement to reach its operative range of voltages.

11 Claims, 7 Drawing Figures

PREBIAS FOR DIGITAL LIGHT INTEGRATOR

BACKGROUND OF THE INVENTION

1. Field of the Invention

This invention relates generally to a photographic exposure control system having a prebiased light integrator and, more particularly, to a photographic exposure control system having a digital light integrator which is prebiased prior to exposure to assure an accurate first light detect at the commencement of the exposure interval.

2. Description of the Prior Art

In the photographic art, exposure control systems embodying scanning shutter blade elements which operate to vary exposure aperture areas with time during the exposure interval are well known as indicated by U.S. Pat. No. 3,942,183, entitled "Camera with Pivoting Blades", by George D. Whiteside, issued Mar. 2, 1976, in common assignment herewith. Such scanning shutter blade mechanisms generally include a pair of counter-reciprocating shutter blade elements each having a primary aperture that traverses the optical axis of the camera during the exposure interval. The primary apertures are shaped so that upon overlying one another during countermovement of the blades, there is defined an effective exposure aperture value which increases to a maximum value in a determinate period of time.

Exposure control is generally provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System with Improved Uniform Trim Control", by Philip R. Norris, issued Aug. 24, 1976, in common assignment herewith.

Such a system need not actually stop the opening shutter blade movement at a maximum effective exposure aperture as determined by the rangefinding or focusing system of the camera, but may instead vary the time at which the strobe light is fired during the opening shutter blade movement as determined in correspondence with the rangefinding or focusing system of the camera. Since the duration of the strobe light is short in comparison with the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus with Flash Exposure Control System", by Edwin H. Land, issued Nov. 18, 1969, in common assignment herewith.

Range responsive flash fire systems of the aforementioned type can also be utilized in conjunction with sonar ranging devices as is more fully described in U.S. Pat. No. 4,188,103, entitled "Range Synchronized Flash Photographic Apparatus and Method for Achieving Optimum Flash Exposure", by Conrad H. Biber et al., issued Feb. 12, 1980, in common assignment herewith. In the aforementioned system, means must be provided for synchronizing the instant at which the scene light is first admitted to the film plane at the commencement of the exposure interval to the transmission of the sonar ranging signal in order to control the strobe fire time at the appropriate aperture. Such a system for firing a flash as a function of a sonar determined ranging signal is also disclosed in U.S. Pat. No. 4,192,587, entitled "Proportional Fill Flash", by Arthur G. LaRocque et al., issued Mar. 11, 1980, in common assignment herewith. An LED in combination with first light detect apertures in the shutter blade mechanism operate to synchronize the transmission of light from the LED to a photocell in correspondence with the instant that scene light is first admitted by the primary apertures in the shutter blades at the commencement of the exposure interval. Such systems, however, generally have not embodied digital scene light integrating techniques which require extended integration lead times for the integration levels to come within required operating voltage ranges before digital pulse counting can begin. This extended integration lead time may thus introduce an error in the precise detection of the instant that scene light is first admitted to the film plane at the commencement of the exposure interval so as to subsequently cause an error in the time at which the flash is fired thereby causing the flash to be fired at an aperture value which might not be properly correlated to the camera-to-subject range. Other types of scene light measurement such as the pre-exposure measurement of ambient scene light must also be made in a precise manner without the error that might otherwise result from an extended integration lead time.

Therefore, it is a primary object of this invention to provide a photographic exposure control system wherein the instant that the scene light is first admitted to the film plane as well as any other scene light related measurement may be accurately and precisely detected utilizing digital integration techniques.

It is a further object of this invention to provide an exposure control system in which the instant that the scene light is first admitted to the film plane is detected by a digital type integrator prebiased to achieve the accuracy required for a precise determination of the initiation of an exposure interval or any other scene light related measurement.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A photographic camera apparatus of the type adapted to be energized at least in part by a source of electrical energy and including means for defining a film plane comprises a source of artificial illumination and a photoresponsive element stationed to receive light from the scene to be photographed and the source of artificial illumination and to provide an output signal having an electrical characteristic which varies as a function of the intensity of light incident thereon. Means are also provided for integrating the output signal from the photoresponsive element and shutter means are provided for controlling the admission of scene light to the film plane to define an exposure interval and for controlling the admission of artificial light to the photoresponsive element to coincide with the commencement of the exposure interval. Circuit means are provided for controlling the energization of the source of artificial illumination so as to illuminate the photoresponsive element prior to the commencement of the exposure interval to assure a minimum integrated output signal level from the integration means at the commencement of the exposure interval and for subsequently powering the source of artificial illumination at the commencement of the exposure interval. Means are also provided to respond to a select change in the integrating means output signal from the minimum integrated output signal level at the commencement of the exposure interval to provide an initiation control signal in substantial correspondence with the commencement of the exposure interval so as to control an exposure influencing operation.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Referring now to FIGS. 1 through 4, there are shown generally at 10 a photographic exposure control shutter apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens (not shown) can be provided in overlying relation with respect to the light entry opening 14. Image carrying light rays from the objective lens which are transmitted by the shutter apparatus 10 in a manner to be subsequently described are thereafter directed to a rearwardly positioned film plane (not shown) by way of a reflecting mirror (also not shown) all of which are stationed within a suitable light tight film exposure chamber (also not shown) in a manner as is more fully described in U.S. Pat. No. 4,040,072, entitled "Shutter Latch Arrangement Releasable Through Shutter Blade Actuation and Resettable Through Film Advancement", B. Johnson et al., issued Aug. 2, 1977, in common assignment and now incorporated by reference herein.

The exposure control shutter apparatus 10 comprises two overlapping shutter blade elements 16 and 18 of the so-called "scanning type" which will be subsequently described in greater detail herein. A pair of scene light admitting primary apertures 20 and 22 are provided, respectively, in the blade elements 16 and 18 to cooperatively define a progressive variation of effective aperture openings in accordance with simultaneous longitudinal and lateral displacement of one blade element with respect to the other blade element in a manner as is fully described in U.S. Pat. No. 3,942,183, entitled "Camera With Pivoting Blades", by G. Whiteside, issued Mar. 2, 1977, in common assignment herewith and now incorporated by reference herein. The apertures 20 and 22 are selectively fitted so as to overlap the light entry exposure opening 14 thereby defining a gradually varying effective aperture size as a function of the position of the blade elements 16 and 18.

Each of the blades 16 and 18 may additionally be configured to have corresponding photocell sweep secondary apertures shown, respectively, at 24 and 26. The photocell sweep secondary apertures 24 and 26 may be configured to track in a predetermined corresponding relationship with respect to the scene light admitting primary apertures 20 and 22. As is readily apparent, the photocell sweep secondary apertures 24 and 26 move in the same manner as the primary apertures 20 and 22 to define a small secondary effective aperture for admitting the passage of scene light transmitted to a photoresponsive element 62 (see FIG. 5) from the scene being photographed. The blades 16 and 18 also include, respectively, a third pair of first light detect apertures 30 and 32 which operate in a manner to be subsequently described to admit light from a source of artificial illumination such as an LED 33, as also shown in the circuit diagram of FIG. 5, to the photoresponsive element 62 in coincidence with the first scene light admitted to the film plane when the primary apertures 20 and 22 initially overlap at the commencement of an exposure interval. The shutter blade element 18 also includes a prebiasing aperture 28 which may be moved out of overlapping relationship with the edge of shutter blade 16 to admit artificial light from the LED 33 to the photoresponsive element 62 in the manner of this invention to be subsequently described herein.

Projecting from the baseblock casting 12 at a location spaced laterally apart from the light entry exposure opening 14 is a pivot pin or stud 34 which pivotally and translatably engages elongate slots 36 and 38 formed in respective shutter blade elements 16 and 18. Pin 34 may be integrally formed with the baseblock casting 12 and blade elements 16 and 18 may be retained in engaging relation with respect to the pin 34 by any suitable means such as peening over the outside end of the pin 34.

The opposite ends of the blade elements 16 and 18 respectively include extended portions which pivotally connect to a walking beam 40. The walking beam 40, in turn, is disposed for rotation relative to the baseblock casting 12 by pivotal connection to a projecting pivot pin or stud 42 which may be integrally formed with the baseblock casting 12 at a location spaced laterally apart from the light entry exposure opening 14. The walking beam 40 may be pivotally retained with respect to the pin 42 by any conventional means such as an E ring (not shown). In the preferred mode, the walking beam 40 is pivotally connected at its distal ends to the shutter blade elements 16 and 18 by respective pin members 44 and 46 which extend laterally outward from the walking beam 40. Pin members 44 and 46 are preferably circular in cross-section and extend through respective circular openings and respective shutter blade elements 16 and 18. Thus, the shutter blade elements 16 and 18 provide a blade mechanism with the means for mounting the blade mechanism for movement being provided by the walking beam 40 together with the pivot pin 34.

Drive means are provided for displacing the blade mechanism and include a tractive electromagnetic device in the form of a solenoid 48 employed to displace the shutter blades 16 and 18 with respect to each other and the baseblock casting 12. A solenoid 48 includes an internally disposed cylindrical plunger unit 50 which retracts inwardly into the body of the solenoid upon energization of the solenoid winding. A solenoid plunger 50 includes an end cap 52 at the outside end thereof together with a vertical slot or groove 54 within the end cap for loosely engaging a pin 56 extending outwardly from the walking beam 40. In this manner, the solenoid plunger 50 is affixed to the walking beam 40 so that longitudinal displacement of the plunger 50 will operate to rotate the walking beam about the pivot pin 40 so as to appropriately displace the shutter blades 16 and 18. The drive means may additionally include a helical compression spring 58 around the plunger 50 so as to continuously urge the end cap 52 outwardly of the solenoid 48, thereby also continuously urging the blade elements 16 and 18 into positions defining the largest effective primary aperture over the light entry exposure opening 14. As will be readily understood, in some shutter blade arrangements it may be preferable to utilize a tension spring in place of the compression spring 58 in a manner as is shown in U.S. Pat. No. 3,942,183, supra. Thus, with the spring connection herein described, the exposure control blade apparatus 10 is biased to continuously urge the shutter blade elements 16 and 18 into an open scene light unblocking orientation as shown in FIG. 4.

Figures 1, 2:
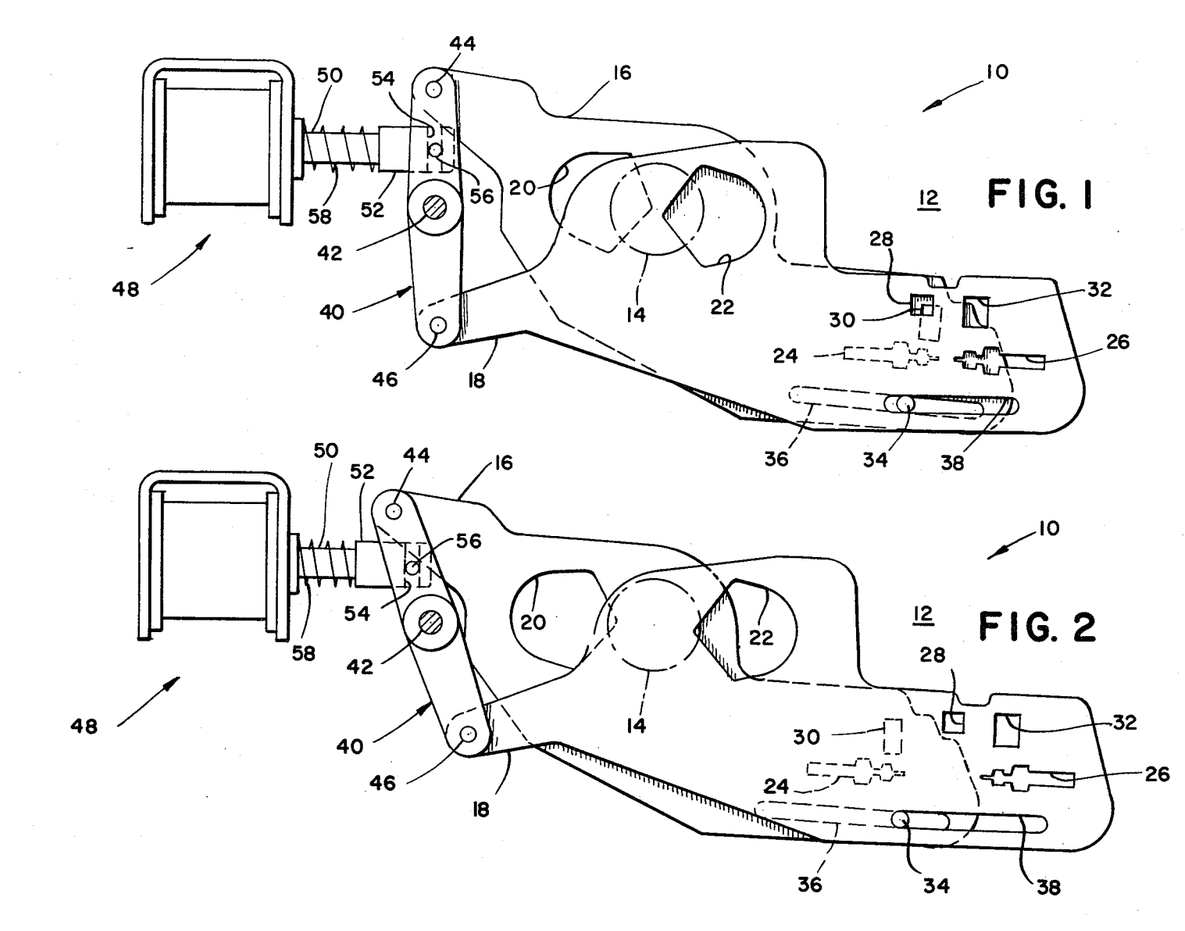
FIG. 1 is a front elevational view of the shutter blade mechanism of this invention.
FIG. 2 is a front elevational view of the shutter blade mechanism of FIG. 1 at a different position from that of FIG. 1.
Figure 4:
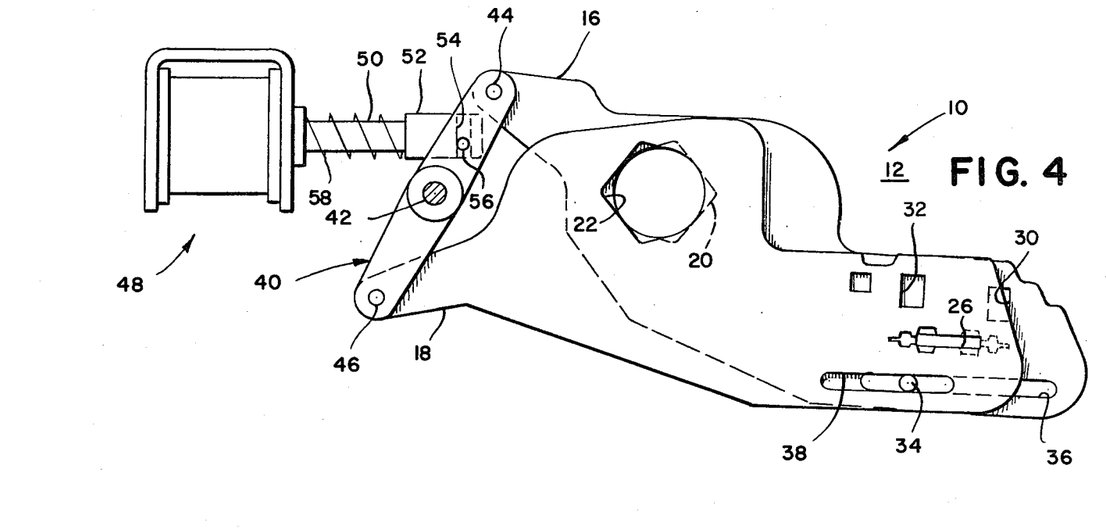
FIG. 4 is a front elevational view of the shutter blade mechanism of FIG. 1 in still another position from that of FIGS. 1, 2 and 3.

In the present arrangement, the shutter blades 16 and 18 are drawn from their scene light unblocking open arrangement as shown in FIG. 4 to their scene light blocking closed arrangement as shown in FIGS. 1 and 2 when the solenoid 48 is energized. Consequently, energization of the solenoid 48 prevents the shutter blades 16 and 18 from moving towards their maximum effective primary aperture defining arrangement under the urging of compression spring 58. However, it should be readily understood that the exposure control system of this invention would be equally applicable to photographic systems where the blades 16 and 18 are spring biased in a normally closed position. However, since in the preferred embodiment the shutter blade elements 16 and 18 are spring biased to move toward their scene light unblocking arrangement, it would otherwise be necessary to maintain the solenoid in a state of continued energizaton in order to hold the shutter blade elements 16 and 18 in their scene light blocking arrangement as shown in FIG. 1. Such continued energization of the solenoid 48, however, would present an intolerable power drain on the camera battery, particularly if the solenoid 48 had to be continuously energized even when the camera apparatus were not in use. In order to avoid this continued energization of the solenoid 46, there is provided a latch mechanism (not shown) which operates normally to latch the shutter blade mechanism in its scene light blocking arrangement as shown in FIG. 1 and which automatically unlatches the shutter blade mechanism to permit the shutter blade elements 16 and 18 to be moved to their scene light unblocking arrangement as shown at FIG. 4 in order to commence a photographic exposure cycle and which further automatically responds at the termination of an exposure cycle to relatch the blade elements 16 and 18 in their scene light blocking arrangement so as to permit deenergization of the solenoid 48. The manner in which the aforementioned latch operates is more fully described in U.S. Pat. No. 4,040,072, supra.

Figure 5:
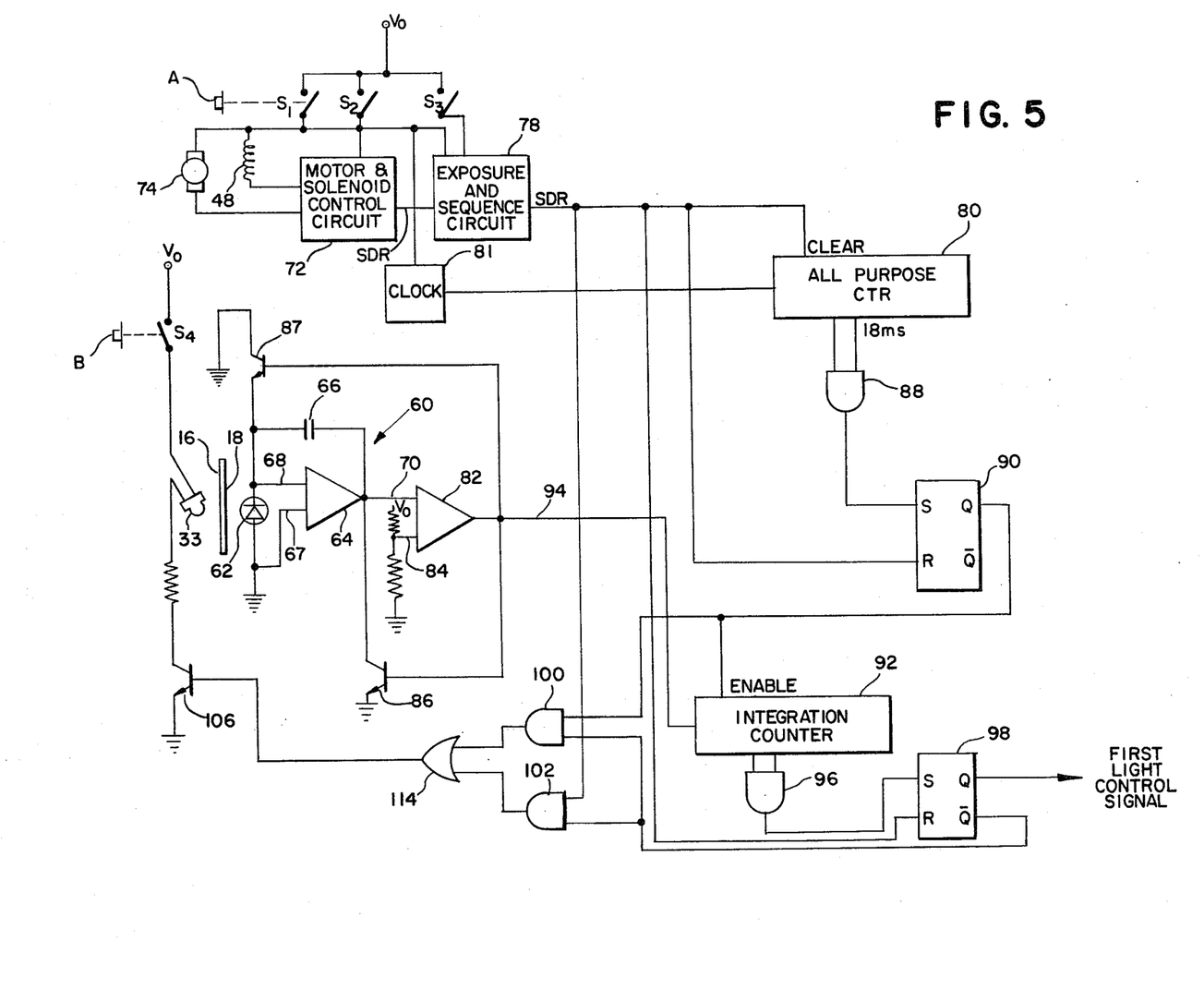
FIG. 5 is an electrical schematic view of a preferred embodiment for the biasing and control system of this invention.

Referring now to FIG. 5, there is shown a schematic wiring diagram for one preferred embodiment for an exposure control circuit embodying the prebiasing exposure control feature of this invention for operation in a manner now to be described. As shown generally at 60, there is provided a scene light detecting and integrating circuit comprising the photoresponsive element 62 connected across the input terminals 67 and 68 of an operational amplifier 64 of the differential variety. When considered ideally, the amplifier 64 has an infinite gain and an infinite input impedance and a zero output impedance. The input circuit of the amplifier 64, however, is structured such that the apparent input impedance for the photoresponsive element 62 is substantially zero, thereby functioning in a manner which permits the photoresponsive element 62 to operate in a current mode. Consequently, the current generated by the photoresponsive element 62 is limited substantially only to its own internal impedance. To accomplish this effect, a feedback integration capacitor 66 is connected between one input terminal 68 of the operational amplifier 64 and an output terminal 70 from the operational amplifier 64.

With the integration feedback arrangement herein described, any difference of potential supplied by the photoresponsive element 62 across input terminals 67 and 68 will operate to cause a current of opposite polarity to be produced through feedback integration capacitor 66. As a consequence, the feedback integration capacitor 66 provides a substantially instantaneous feedback signal of opposite polarity which serves to counteract any differential signal voltage impressed by the photoresponsive element 62 across the input terminals 67 and 68. Thus, although the amplifier 64 has a very high input impedance, the photoresponsive element 62, when connected in the aforementioned manner, experiences only a very low input impedance to the amplifier 64. Therefore, the current output of the photoresponsive element 62 is directed into the feedback integration capacitor 66. In this manner, the photoresponsive element 62 is connected to operate in a constant current mode of operation under conditions of nonvarying scene light intensity to provide a substantially linear output response at output terminal 70 as is more fully described in U.S. Pat. No. 3,620,143, entitled "Automatic Exposure Control System with Fast Linear Response", by J. Burgarella, issued Nov. 16, 1971, in common assignment herewith and now incorporated by reference herein in its entirety.

The exposure control circuitry herein described preferably derives power from a battery that is insertable within the camera in correspondence with a film pack or cassette in a manner that is well known in the art for Polaroid SX-70 type film cassettes and cameras. The aforementioned film cassette battery is preferably utilized to power the circuitry in FIG. 5 in its entirety by way of three switches $S_1$, $S_2$, and $S_3$ in a manner as is more fully described in U.S. Pat. No. 4,040,072, supra. The exposure control circuitry of FIG. 5 also includes a motor and solenoid control circuit 72 which operates in a manner as is more fully described in U.S. Pat. No. 4,040,072, supra. As is readily apparent, the motor and solenoid control circuit 72 operates to control the energizing current delivered to the solenoid 48 and to a motor 74. The film units intended for use with the camera of this invention are preferably of the self-developing type, and the motor 74 is provided to effect the advancement of processing of the self-developing film units in a well-known manner.

The photographic apparatus may also include an electronic flash or strobe (not shown) which is powered and fired in a manner as is fully described in U.S. Pat. No. 4,192,587, entitled "Proportional Fill Flash", by A. LaRocque et al., issued Mar. 11, 1980, in common assignment herewith and now incorporated by reference herein in its entirety. The electronic flash (not shown) may be powered upon closure of a switch $S_4$ manually actuated by a button B whereupon the LED 33 is simultaneously powered by means not shown to provide an indication through the camera viewfinder that the strobe is being charged and not in a state of readiness for implementing a photographic exposure cycle as is fully described in U.S. Pat. No. 4,192,587, supra. When the strobe becomes fully charged in readiness for a photographic exposure cycle, the LED 33 is turned off by the same means not shown to provide a visual indication to the photographer of strobe charge readiness in a manner as is again fully described in U.S. Pat. No. 4,192,587, supra.

When the electronic flash is fully charged in the aforementioned manner, a photographer may initiate a photographic exposure cycle by manually actuating another button A so as to close the switch $S_1$ in a manner as is more fully described in U.S. Pat. No. 4,040,072, supra. Closure of the switch $S_1$, in turn, signals an exposure and sequencing circuit 78 in a manner as is fully disclosed in U.S. Pat. No. 4,192,587, supra to provide a high (binary logic 1) solenoid drive signal along output line SDR to the motor and solenoid control circuit 72 so as to energize the solenoid 48 and retract the plunger 50 inwardly to rotate the walking beam 40 in a counterclockwise direction from its position as shown in FIG. 1 to its position as shown in FIG. 2. This limited counterclockwise movement of the walking beam 40 operates to effect the release of a latch mechanism (not shown) while simultaneously effecting the closure of the switches $S_2$ and $S_3$ in a manner as is again more fully described in U.S. Pat. No. 4,040,072, supra. The high (binary logic 1) output signal from the exposure and sequencing circuit 78 along the output line SDR operates to clear an all purpose counter 80 causing all the output signals therefrom to go to a low (binary logic 0) output signal level. The high (binary logic 1) output signal along line SDR also provides a reset signal to the reset terminals of flip-flops 90 and 98 respectively so as to cause the output signals from the Q terminals thereof to go to low (binary logic 0) levels while at the same time causing the output signals from the $\overline{Q}$ terminals thereof to go to high (binary logic 1) levels.

Closure of the switch $S_3$ also operates to provide a logic signal by way of the exposure and sequencing circuit 78 to power the solenoid 48 from an initial high current energization condition required to retract the plunger 50 to a low current energization condition required to temporarily hold the plunger in its retracted position as shown in FIG. 2. The powering down of the solenoid 48 to a holding current mode is accomplished in a manner as is fully described in U.S. Pat. No. 4,192,587, supra, and does not affect the assertive (binary logic 1) output signal level provided from the exposure and sequencing circuit 78 along the output line SDR. The assertive (binary logic 1) output signal level from output line SDR and the assertive (binary logic 1) output signal level from the $\overline{Q}$ terminal of flip-flop 98 are directed respectively to two input terminals of an AND gate 102 by way of the interconnecting lines as shown. Thus, the AND gate 102 is switched in synchronism with the energization of the solenoid 48 to provide an assertive (binary logic 1) output signal level to an OR gate 104 so as to switched the OR gate 104 to provide an assertive (binary logic 1) base drive output signal level to an NPN transistor 106. The transistor 106 is thereby driven into saturation to provide an energizing current to the LED 33 when the shutter blades are in the position as shown in FIG. 2. As is now readily apparent, when the shutter blade elements 16 and 18 are driven to the extreme counterclockwise walking beam position as shown at FIG. 2, the prebiasing aperture 28 from the shutter blade 18 is driven beyond the edge of the blade 16 and into direct alignment between the LED 33 and photoresponsive element 62 so as to allow the transmission of light from the LED 33 to the photoresponsive element 62.

Figure 6:
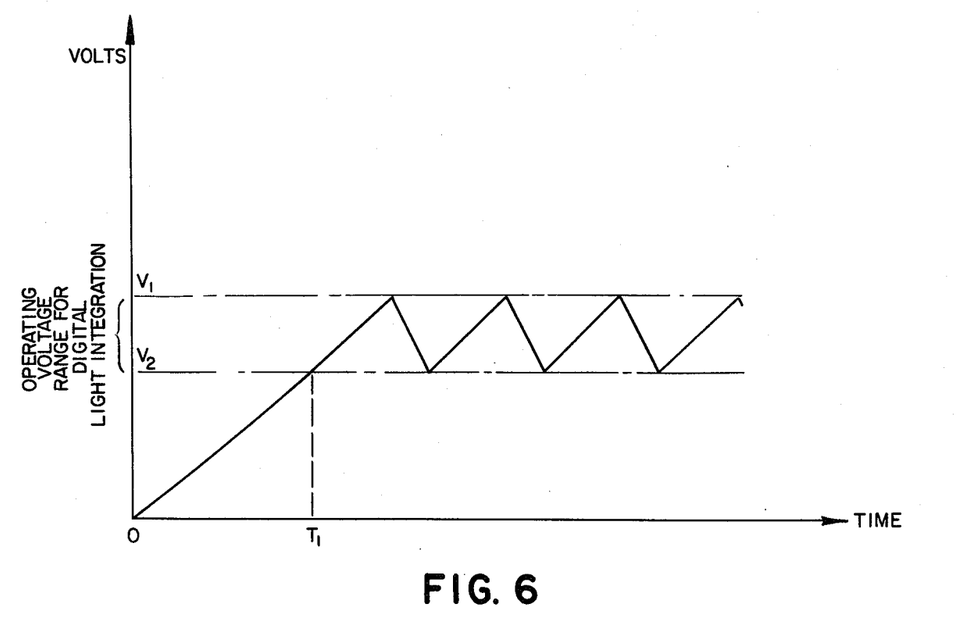
FIG. 6 is a graphical representation of the output signal level of a light integrating circuit in FIG. 5.
Figure 7:
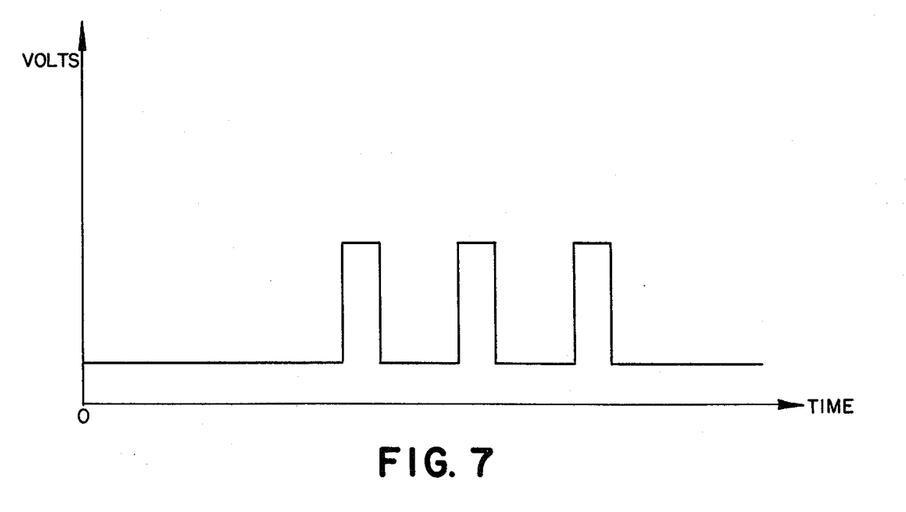
FIG. 7 is a graphical representation of the output signal wave from a comparator circuit in FIG. 5.

The scene light integrating circuit 60 responds to the incident light from the LED 33 to provide an integrated output response as shown in FIG. 6. The integrated output response along output line 70 is directed to an input terminal of a comparator 82 which operates to compare the integrated output voltage signal level along line 70 with a select reference voltage signal level $V_1$ as derived from input line 84. When the output voltage signal level from the integrating circuit 60 along line 70 reaches the selected reference signal level $V_1$ along line 84, the comparator 82 switches from a low (binary logic 0) output signal level to an assertive (binary logic 1) output signal level along output line 94 to drive an NPN transistor 86 into saturation and thereby discharge the feedback integration capacitor 66. Additionally, an NPN transistor 87 connected to reverse operating mode is simultaneously turned on to divert current from the photoresponsive element 62. The output signal level from the integrating circuit 60 discharges to a selected voltage value $V_2$ below the selected reference level $V_1$ as shown in FIG. 6 whereupon the comparator 82 switches back to provide a low (binary logic 0) output signal level to turn off the transistor 86 and allow the integration circuit 60 to resume integrating back to the select reference voltage signal level $V_1$. The comparator 82 and light integrating circuit 60 continue to cycle in the aforementioned manner between the selected reference voltage $V_1$ and the selected value below the reference voltage $V_2$ as a result of the hysteresis associated with the comparator 82 to provide the saw tooth output signal along line 70 as shown in FIG. 6. The output signal from the comparator 82 at line 94 approximates a pulse train as shown in FIG. 7 whereupon the pulses are subsequently counted by an integration counter as shown at 92 to ultimately provide the requisite exposure control command signals based upon the total number of pulses counted.

As is now readily apparent, the initial integration lead time $T_1$ for the output voltage signal level from the light integration circuit 60 at output line 70 to reach the selected reference voltage $V_1$ is significant and may even be in the order of 30 to 40 milliseconds. This long a lead time which is not accounted for by the integration counter 92 can introduce an intolerable error to any subsequent exposure control and in particular to the detection of the instant of initial scene light admission to the film plane which is crucial to determining the exact instant of strobe fire during the exposure interval as is fully described in U.S. Pat. No. 4,192,587.

Figure 3:
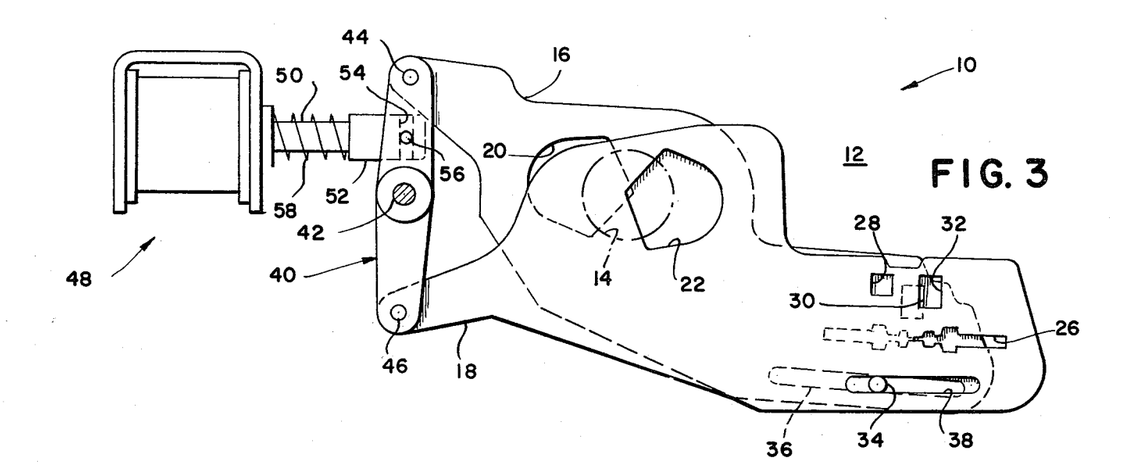
FIG. 3 is a front elevational view of the shutter blade mechanism of FIG. 1 at still another position from that of FIGS. 1 and 2.

The motor and solenoid control circuit 72 is subsequently signalled in a manner as is more fully described in U.S. Pat. No. 4,192,587, supra to deenergize the solenoid 48 and release the shutter blade elements 16 and 18 to move toward the position as shown in FIG. 3 to commence an exposure interval. The exposure and sequencing circuit 78 provides in synchronism with the deenergization of the solenoid 48 a low (binary logic 0) output signal level along line SDR so as to switch the AND gate 102 back to a low (binary logic 0) output signal level thereby switching the OR gate 104 to a low (binary logic 0) output signal level to turn off the transistor 106 and deenergize the LED 33. The low (binary logic 0) output signal level along the line SDR removes the clear signal from the all purpose counter 80 enabling the all purpose counter 80 to begin counting a clock pulse from a clock 81. In this manner, the all purpose counter 80 is synchronized to start counting generally in correspondence with the initial movement of the shutter blades 16 and 18 from the position as shown in FIG. 2 toward the position as shown in FIGS. 3 and 4.

Approximately 18 milliseconds subsequent to the deenergization of the solenoid 48, a decode signal is provided from the all purpose counter 80 by an AND gate 88 which switches to provide an assertive (binary logic 1) output signal level to set the flip-flop 90. The flip-flop 90, in turn, switches to provide an assertive (binary logic 1) output signal level from terminal Q to enable the integration counter 92 and at the same time to provide an assertive (binary logic 1) output signal level to one input terminal of an AND gate 100. The other input terminal to the AND gate 100 is already at a (binary logic 1) output signal level by virtue of the output received from the Q terminal of flip-flop 98. Thus, the AND gate 100 switches to provide a high (binary logic 1) output signal to the OR gate 104, in turn, switching the OR gate to provide an assertive (binary logic 1) base drive output signal level to drive the transistor 106 into saturation and again energize the LED 33. In this manner, the the LED 33 is energized immediately prior to the shutter blade elements 16 and 18 reaching the position as shown in FIG. 3 where the exposure interval commences and scene light is first admitted to the film plane. As is readily apparent, the primary apertures 20 and 22 just begin to overlap to admit scene light to the film plane at the same time that the photocell sweep secondary apertures 24 and 26 begin to overlap to admit scene light to the photoresponsive element 62.

The first light detect apertures 30 and 32 also begin to overlap to admit artificial light from the LED 33 to the photoresponsive element 62 in synchronism with the first light admitted by the primary apertures 20 and 22 to the film plane. The light detecting and integrating circuit 60 detects and integrates the artificial light from the LED to provide the saw tooth output signal along line 70 as shown in FIG. 6 to the comparator 82. The comparator 82, in turn, provides the output pulse train as shown in FIG. 7 to the integration counter which is decoded upon reaching a pulse count of 3 by an AND gate 96 being switched to provide an affirmative (binary logic 1) output signal to the set terminal of flip-flop 98. The output signal level at terminal Q from flip-flop 98 is thereby switched to an assertive (binary logic 1) output signal level to control a subsequent exposure influencing operation such as the initiation of flash fire in a manner as is fully disclosed in U.S. Pat. No. 4,192,587, supra. The output signal level from terminal $\overline{Q}$ of flip-flop 98 also simultaneously switches to a low (binary logic 0) output signal level to switch the AND gate 100 to provide a low (binary logic 0) output signal level, in turn, switching the OR gate 104 to provide a low (binary logic 0) output signal level and thereby turning off the transistor 106 and deenergizing the LED 33. The shutter blade elements continue to move toward the maximum aperture defining position as shown in FIG. 4 with the exposure and flash fire control being fired in a manner as is again fully described in U.S. Pat. No. 4,192,587.

The prebiasing of the photoresponsive element 62 in the manner of this invention provides for an accurate detection of the instant at which the scene light is first admitted to the film plane at the commencement of an exposure interval since the output voltage signal level from the light integration circuit 60 will always be at least within the range of operating voltages $V_1$ and $V_2$ immediately prior to the commencement of the exposure interval. Thus, any potential errors which would otherwise result from the integration lead time required to charge the light integrating circuit 60 to the minimum voltage within the operating range of voltages between $V_1$ and $V_2$ are eliminated. Since the subsequent exposure operations such as firing the flash depends upon an accurate determination of the commencement of the exposure interval, there can be no error during the aforementioned detect operation which might otherwise result if the output voltage from the light detector 60 were below the operative range between $V_1$ and $V_2$ at the instant of first light detect.

Although the invention has been described primarily in relation to enabling the precise detection of the instant at which scene light is first admitted to the film plane at the start of the exposure interval, it will be readily understood that prebiasing the digital light integrator in the manner of this invention also allows other subsequently made scene light related measurements such as the pre-exposure ambient scene light measurement as described in U.S. Pat. No. 4,192,587 to be more accurate and precise.

Other embodiments of the invention, including additions, subtractions, deletions and other modifications of the preferred disclosed embodiments of the invention will be obvious to those skilled in the art and are within the scope of the following claims.

What is claimed is:

1. A photographic camera apparatus of the type adapted to be energized at least in part by a source of electrical energy and including means for defining a film plane comprises:
   a source of artificial illumination;
   a photoresponsive element stationed to receive light from the scene to be photographed and said source of artificial illumination and to provide an output signal having an electrical characteristic which varies as a function of the intensity of light incident thereon;
   means for integrating the output signal from the photoresponsive element;
   shutter means for controlling the admission of scene light to the film plane to define an exposure interval and for controlling the admission of artificial light to said photoresponsive element to coincide with the commencement of said exposure interval;
   circuit means for controlling the energization of said source of artificial illumination so as to illuminate said photoresponsive element prior to the commencement of said exposure interval to assure a minimum integrated output signal level from said integration means at the commencement of said exposure interval and for subsequently powering said source of artificial illumination at the commencement of said exposure interval; and
   means responsive to a select change in said integrating means output signal from said minimum integrated output signal level at the commencement of said exposure interval for providing an initiation control signal in substantial correspondence with the commencement of the exposure interval so as to control an exposure influencing operation.

2. The photographic camera apparatus of claim 1 wherein said integrating means includes an integration capacitor for receiving charging current during integration and said means for providing said initiation control signal comprises a comparator circuit for comparing the output signal level from said integrating means with a select reference signal level and switching from a first select output signal level to a second select output signal level when the output signal level from said integrating means reaches said select reference signal level; means for discharging said integration capacitor in response to said comparator switching to its said second select signal level until the output signal level from said integration means discharges to a selected value below said select reference signal level thereby switching said comparator output signal level back to its said first select level to disable said discharge means from further discharging said integration capacitor and resuming integration by recharging said integration capacitor; and means for counting the number of times said comparator switches from its said first select output signal level to its said second select output signal level.

3. The photographic camera apparatus of claim 2 wherein said minimum integrated output signal level to which said integration means is charged by said pre-exposure energization of said source of artificial illumination is at least equal to said selected value below said selected reference signal level at which said comparator output signal level switches from its said second select level back to its said first select level.

4. The photographic camera apparatus of claim 1 wherein said shutter means comprises a shutter blade mechanism and means for mounting said shutter blade mechanism for displacement from a first arrangement in which said shutter blade mechanism blocks the admission of scene light to the film plane and at the same time admits the light from said source of artificial illumination to said photoresponsive element to assure said minimum integrated output signal level from said integration means, to a second arrangement in which said shutter blade mechanism blocks the admission of scene light to the film plane and at the same time blocks the admission of light from said source of artificial illumination to said photoresponsive element, to a third arrangement in which said shutter blade mechanism admits scene light to the film plane to commence an exposure interval and at the same time admits light from the source of artificial illumination to said photoresponsive element to provide said initiation control signal.

5. The photographic camera apparatus of claim 2 wherein said shutter means also includes energizable drive means for driving said blade mechanism to its said first arrangement and resilient drive means for driving said blade mechanism from said first arrangement to its said second and third arrangements and said circuit means is responsive to the initial energization of said energizable drive means to drive said blade mechanism to its said first arrangement for controlling the energization of said source of artificial illumination so as to illuminate said photoresponsive element to assure said minimum integrated output signal level and to the subsequent deenergization of said energizable drive means to allow said resilient drive means to drive said blade mechanism from its said first arrangement toward its said second and third arrangements for controlling the deenergization of the source of artificial illumination.

6. The photographic camera apparatus of claim 5 wherein said circuit means also responds to the deenergization of said energizable drive means to time a subsequent reenergization of said source of artificial illumination at least prior to said blade mechanism being moved to its said third arrangement.

7. The photographic camera apparatus of claim 2 wherein said shutter blade mechanism comprises a pair of overlapping shutter blade elements having: a first pair of respective apertures therethrough which align with respect to each other to admit artificial light from said source of artificial illumination to said photoresponsive element when said shutter blade mechanism is in its said first arrangement, a second pair of respective primary apertures therethrough which start to overlap with respect to each other to admit scene light to the film plane to commence said exposure interval, when said blade mechanism is in its said third arrangement, and a third pair of respective apertures therethrough which start to overlap with respect to each other to admit artificial light from said source of artificial illumination to said photoresponsive element in correspondence with the commencement of said exposure interval when said blade mechanism is in its said third arrangement.

8. A photographic camera apparatus of the type adapted to be energized at least in part by a source of electrical energy and including means for defining a film plane comprises:

a source of artificial illumination;

a photoresponsive element stationed to receive light from the scene to be photographed and said source of artificial illumination and to provide an output signal having an electrical characteristic which varies as a function of the intensity of light incident thereon;

means for integrating the output signal from said photoresponsive means comprising an integration capacitor for receiving charging current during integration;

shutter means for controlling the admission of scene light to the film plane to define an exposure interval;

means providing an exposure influencing control signal responsive to said integrated output signal from said integration means comprising: a comparator circuit for comparing the output signal level from said integration means with a select reference signal level and switching from a first select output signal level to a second select output signal level when the output signal level from said integrating means reaches said select reference signal level; means for discharging said integration capacitor in response to said comparator switching to its said second select signal level until the output signal level from said integration means discharges to a selected value below said select reference signal level thereby switching said comparator output signal level back to its said first select level to disable said discharge means from further discharging said integration capacitor and resuming integration by recharging said integration capacitor; and means for counting the number of times said comparator switches from its said first select output signal level to its said second select output signal level; and circuit means for controlling the energization of said source of artificial illumination so as to illuminate said photoresponsive element prior to the commencement of said exposure interval to assure that the minimum integrated output signal level from said integration means is at least equal to said selected value below said selected reference signal level at which said comparator output signal level switches from its said second select level back to the said first select level.

9. The photographic camera apparatus of claim 8 wherein said shutter means comprises a shutter blade mechanism and means for mounting said shutter blade mechanism for displacement from a first arrangement in which said shutter blade mechanism blocks the admission of scene light to the film plane and at the same time admits the light from said source of artificial illumination to said photoresponsive element to assure said minimum integrated output signal level from said integration means, to a second arrangement in which said shutter blade mechanism blocks the admission of scene light to the film plane and at the same time blocks the admission of light from said source of artificial illumination to said photoresponsive element, to a third arrangement in which said shutter blade mechanism admits scene light to the film plane to provide an exposure interval.

10. The photographic camera apparatus of claim 9 wherein said shutter means also includes energizable drive means for driving said blade mechanism to its said first arrangement and resilient drive means for driving said blade mechanism from its said first arrangement to its said second and third arrangements and said circuit means is responsive to the initial energization of said energizable drive means to drive said blade mechanism to its said first arrangement for controlling the energization of said source of artificial illumination so as to illuminate said photoresponsive element to assure said minimum integrated output signal level and to the subsequent deenergization of said energizable drive means to allow said resilient drive means to drive said blade mechanism from its said first arrangement toward its said second and third arrangements for controlling the deenergization of the source of artificial illumination.

11. The photographic camera apparatus of claim 9 wherein said shutter blade mechanism comprises a pair of overlapping shutter blade elements having: a first pair of respective apertures therethrough which align with respect to each other to admit artificial light from said source of artificial illumination to said photoresponsive element when said shutter blade mechanism is in its said first arrangement, and a second pair of respective primary apertures therethrough which overlap with respect to each other to admit scene light to the film plane to provide said exposure interval, when said blade mechanism is in its said third arrangement.

* * * * *